United States Patent [19]

Mayer et al.

[11] Patent Number: 4,947,131
[45] Date of Patent: Aug. 7, 1990

[54] CAPACITANCE BAR SENSOR

[75] Inventors: William N. Mayer, White Bear Lake, Minn.; Roger Oestreich, River Falls, Wis.; Daniel W. Mayer, St. Paul, Minn.

[73] Assignee: Modern Controls, Inc., Minneapolis, Minn.

[21] Appl. No.: 341,493

[22] Filed: Apr. 21, 1989

[51] Int. Cl.⁵ .............................................. G01B 7/08
[52] U.S. Cl. .................... 324/671; 324/685; 324/687
[58] Field of Search ............... 324/685, 670, 671, 660, 324/661, 662

[56] References Cited

U.S. PATENT DOCUMENTS

| | | | |
|---|---|---|---|
| 3,471,780 | 10/1969 | Beddows | 324/671 |
| 3,523,246 | 8/1970 | Hall | 324/671 |
| 3,713,966 | 1/1973 | Lippke | 324/671 |
| 3,764,899 | 10/1973 | Peterson | 324/672 |
| 4,514,812 | 4/1985 | Miller | 324/671 |

FOREIGN PATENT DOCUMENTS 2038483  7/1983  United Kingdom .

Primary Examiner—Reinhard J. Eisenzopf
Assistant Examiner—Jose M. Jolis
Attorney, Agent, or Firm—Paul L. Sjoquist

[57] ABSTRACT

A capacitance sensor for measuring thickness variations in film materials, having a sensor mounted in a housing plate slot, with an air gap between the sensor and the housing plate, the sensor being affixed to an insulator support plate, the insulator support plate being affixed to the housing plate, with a bottom plate affixed against the lower side of the housing plate, having enlarged openings for permitting the passage of a conductor to the sensor; all of the conductor and insulator materials having a coefficient of linear temperature expansion of less than $1 \times 10^{-6}$ per degree centigrade, the insulator materials having virtually no dialectic variation with temperature.

6 Claims, 2 Drawing Sheets

CAPACITANCE BAR SENSOR

BACKGROUND OF THE INVENTION

The present invention relates to an apparatus for measuring the thickness of films such as plastic films, wherein such measurements are made by detecting capacitance variations when the film is placed in proximity to a sensing head, wherein variations in film thickness cause corresponding dielectric variations which are detected as variations in measured capacitance.

The use of capacitance measuring sensors for measuring film thickness is known in the art, one form of which is disclosed in U.S. Pat. No. 3,764,899, issued Oct. 9, 1973, and owned by the assignee of the present invention. This patent measures film thickness by passing the film through a capacitance sensor, wherein variations in film thickness are sensed as dielectric thickness variations between the capacitance members, and are detected as variations in a signal which is applied to the capacitance members.

Another form of capacitance measuring device is disclosed in British Patent No. 2,038,483, issued July 20, 1983, and owned by the assignee of the present invention. This patent discloses a capacitance sensor for sensing film thickness changes wherein the film is passed over capacitance elements arranged in side-by-side relationship, variations in film thickness being detected as variations in a signal applied to an electrode positioned in an air gap over which the film is moved. The present invention is an improvement in the construction of the capacitance sensor disclosed in the foregoing British patent.

Measurement instruments of the type for which the invention finds utility are typically used to measure plastic film thicknesses in the range of 0.001–0.050 inch (1–50 mil). Such instruments should have a sensitivity to enable them to detect variations in film thickness of plus or minus 0.1 percent, and subsequent measurements should be repeatable to within about 1 percent. Thus, when a 1 mil plastic film is measured its thickness should be determined with accuracy of plus or minus 0.001 mil, in order to provide results which may be useful in the industrial process control of manufacturing the plastic film. Measurement accuracy should be maintained over a range of ambient temperatures which are found in the typical environment where such instruments are used. In industrial process control applications it is not unusual for ambient temperature changes of plus or minus 10° C. to occur.

A problem in prior art measurement devices has been the inability to maintain accurate measurements of film thickness over a range of ambient temperature changes, due to the fact that the measuring device itself undergoes temperature changes which cause measurement changes exceeding the permissible accuracy range. For example, it has been found that a prior art measuring device introduced measurement errors of a magnitude approximately equal to 1 mil of equivalent plastic film thickness. Thus, if the device were used to measure plastic film of 1 mil thickness, the measurement errors caused by the temperature effects on the measurement device itself could generate a thickness measurement error of approximately 100 percent. An examination of the prior art device has led to the conclusion that the effects of temperature on the measurement device are caused both by temperature expansion and contraction of the measurement components themselves, and also by the temperature coefficients of the dielectric materials associated with the measurement instrument. Accordingly, it is an object of the present invention to provide a measurement device having a sensor head which provides exceedingly low measurement errors resulting from temperature effects on material expansion and dielectric changes.

It is another object of the present invention to provide a capacitance sensor head which is operable to within less than 0.1 percent sensitivity over ambient temperature changes of plus or minus 10° C.

SUMMARY OF THE INVENTION

A capacitive sensor for measuring changes in thickness of a plastic film which passes over the sensor in contacting relationship, wherein the sensor is constructed to include an elongated electrode centered between two adjacent electrodes, wherein an air gap exists between the center electrode and the adjacent electrodes, which are electrically grounded. The invention is constructed to minimize the effects of temperature changes upon the capacitance measurements made by the sensor, both in terms of the temperature effects causing relative expansion and contraction of the dimension of the measuring components, and also in terms of the temperature effects causing relative changes in the dielectrics found between capacitive members. The center electrode and the adjacent side electrodes are rigidly affixed in predetermined spaced-apart relationship, wherein the relationship is unaffected by temperature changes, and the electrical components are surrounded by a dielectric media which is unaffected by temperature variations, by making a direct electrical connection to the center electrode without passing the conductor through a material having a dielectric temperature coefficient.

DESCRIPTION OF THE PREFERRED EMBODIMENT

Figure 1:
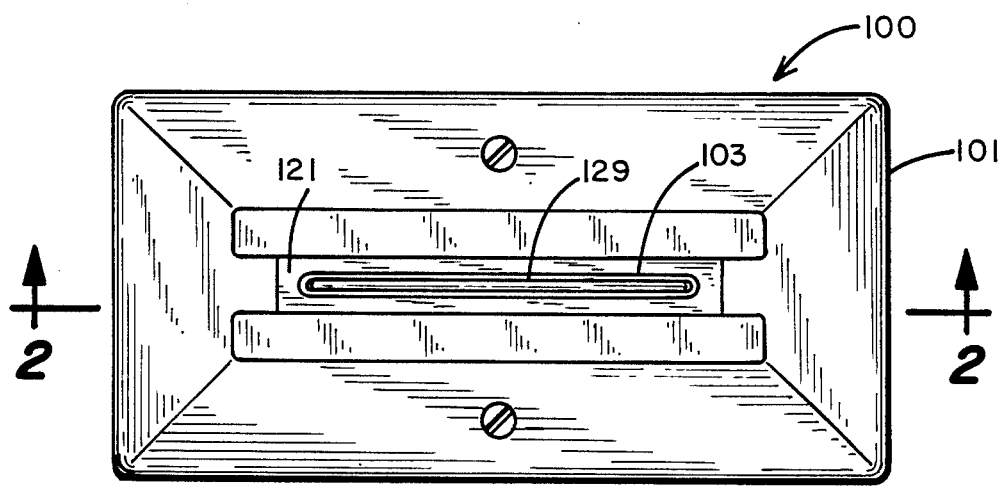
FIG. 1 shows a top view of the invention.
Figure 2:
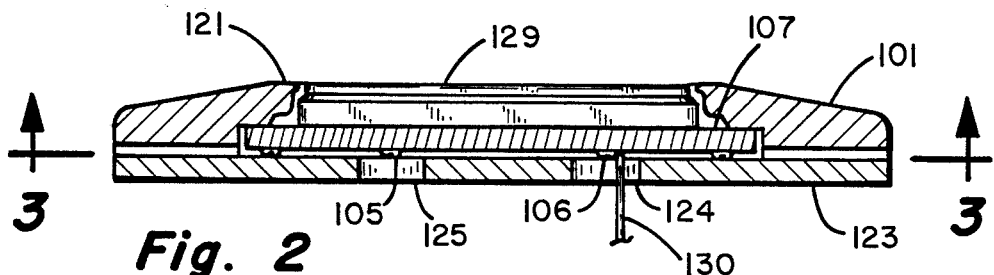
FIG. 2 shows a partial cross-sectional view taken along the lines 2—2 of FIG. 1.
Figure 3:
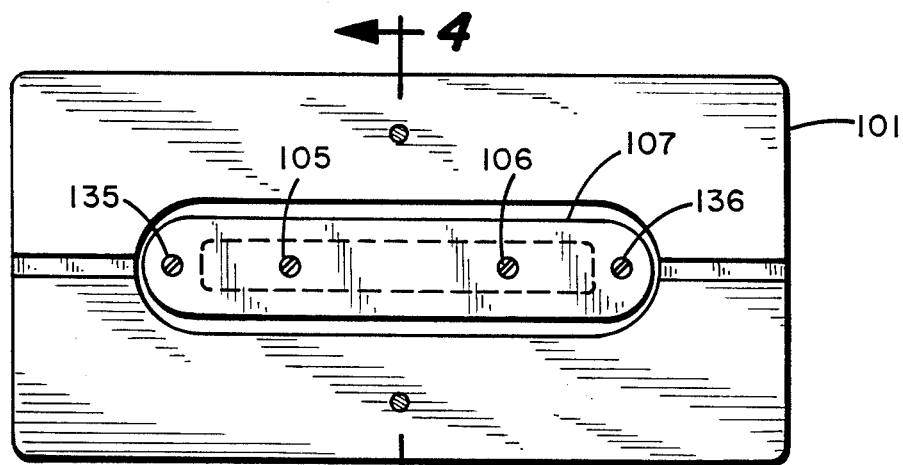
FIG. 3 shows a cross-sectional view taken along the lines 3—3 of FIG. 2.
Figure 4:
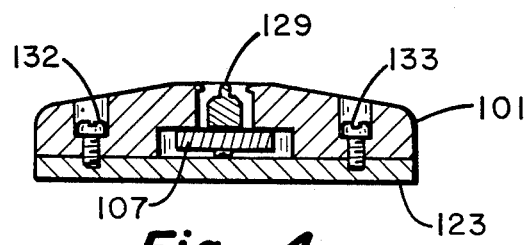
FIG. 4 shows a cross-sectional view taken along the lines 4—4 of FIG. 3.
Figure 5:
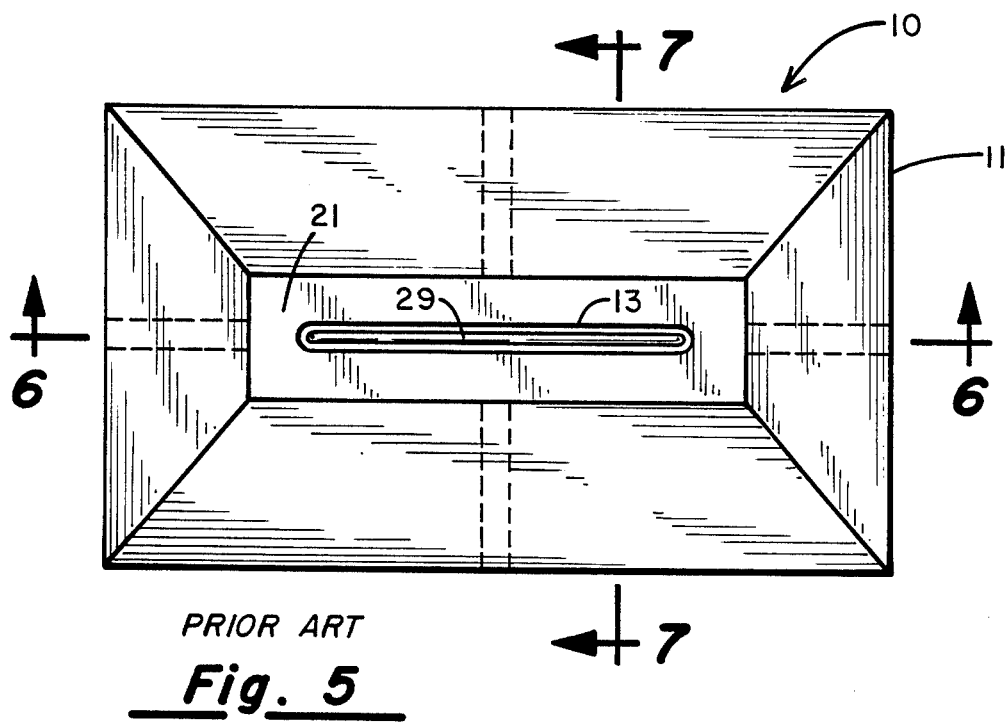
FIG. 5 shows a top view of the prior art device of which the present invention is an improvement.
Figure 6:
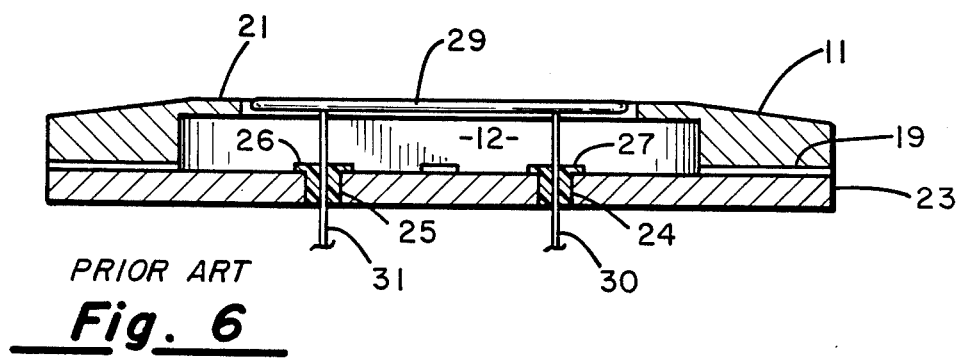
FIG. 6 shows a partial cross-sectional view taken along the lines 6—6 of FIG. 5.
Figure 7:
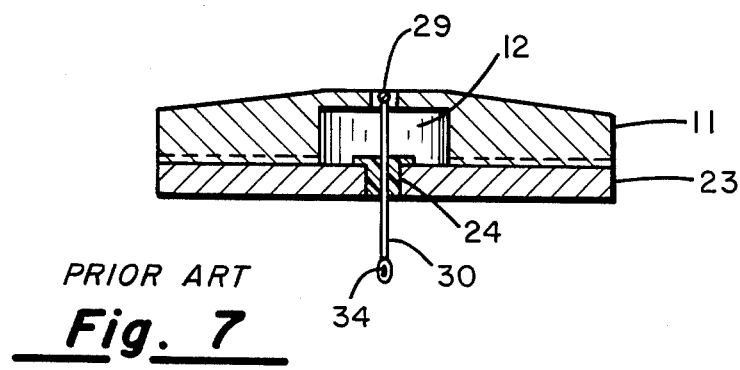
FIG. 7 shows a cross-sectional view taken along the lines 7—7 of FIG. 5.

The preferred embodiment of the present invention can best be understood by reference to the prior art from which the present invention is an improvement, which prior art is shown in several views in FIGS. 5–7. The prior art is also shown and described in British Patent No. 2,038,843, issued July 20, 1983, which disclosure is incorporated by reference herein. The capacitive sensor 10 has a top portion 11 formed of aluminum, with an internal cavity 12 and an upwardly opening slot 13 in a flat top surface 21. Capacitive sensor 10 also has a bottom portion 23 formed of aluminum through which are formed a pair of apertures 24 and 25. An elongated electrode 29, formed of a rod-like element preferably of material having a low temperature coefficient such as Invar is position centered within slot 13, and is supported by a pair of copper support rods which are held in apertures 24 and 25 by suitable insulating material 26 and 27, such as a sealing glass known as Kovar. At least one of the rods 30 and 31 has a connection terminal 34 formed thereon, for electrical connection to a suitable circuit such as is disclosed in the foregoing patent. A plurality of passages such as passage 19 may be formed between the upper portion 11 and the lower portion 23 for the passage of cooling air.

In operation, the prior art device of FIGS. 5-7 is adapted to be placed into contact with a plastic film material, wherein the film material overlies flat top surface 21 and electrode 29, and a signal applied to terminal 34 is monitored for changes in electrical characteristic. Such signal changes are empirically derived to be representative of the thickness of the plastic film material overlying the sensor. The signals remain relatively constant when the plastic film material is moved relative to the top surface of the sensor, so long as the thickness of the film material remains constant. Variations in film thickness are detected as variations in the signal on terminal 34, which signal variations may be processed to provide a visual or other indication of thickness variations.

It has been found that the prior art sensor is also sensitive to temperature changes in the environment in which the sensor is used. These temperature-caused signal changes may seriously affect the accuracy of the sensor, particularly when measuring relatively thin plastic films, and when accuracies in the range of $\pm 0.1$ percent are desired. Under these conditions, the capacitance changes caused by relatively small variations in film thickness are eclipsed by capacitance changes caused by the temperature effects upon the sensor itself. For example, a plastic Mylar film of nominal thickness of 1.0 mil was measured by a sensor of this type, wherein a change in the thickness of the Mylar film of 0.001 mil resulted in a change in the capacitance measurement of $8.3 \times 10^{-5}$ pF. However, it has been found that a change in the ambient temperature in which the prior art device of FIGS. 5-7 is used, in the amount of 10° C., will itself produce an apparent capacitance change of $100 \times 10^{-5}$ pF, which is equivalent to an apparent Mylar film with a thickness change of more than 0.01 mil. Therefore, the accuracy of the prior art sensor is less than 0.01 mil under normal ambient temperature change possibilities. Using the prior art device of FIGS. 5-7, it is therefore impossible to achieve a film thickness accuracy of 0.1 percent, without changing the construction of the device.

In analyzing the causes of the signal variations with changes in temperature, it was determined that the causes are two-fold: (1) the coefficient of linear expansion of the respective materials causes the component spacing to vary with temperature; and (2) the dielectric constant of the respective insulator components also has a temperature coefficient which causes variations in apparent capacitance measurements. For example the coefficient of linear expansion for aluminum is $23 \times 10^{-6}$ per degree Centigrade. However, when a solid is heated it does not just increase in length, it increases in all dimensions; the coefficient of area expansion is approximately two times the coefficient of linear expansion. By contrast, the coefficient of linear expansion of Invar is $0.9 \times 10^{-6}$ per degree Centigrade, which is relatively stable. The coefficient of linear expansion of copper is $17 \times 10^{-6}$ per degree Centigrade. The prior art uses an Invar rod 29 centrally positioned in a slot 13, with an air gap therebetween, and the Invar rod 29 is supported on a pair of copper rods 30 and 31. These three materials are affected differently with increases in temperature; the aluminum top portion 11 is subjected to a coefficient of area expansion on the order of $45 \times 10^{-6}/°C.$, the copper rods are subjected to a coefficient of linear expansion on the order of $17 \times 10^{-6}/°C.$, and the Invar rod is subjected to a coefficient of linear expansion of $0.9 \times 10^{-6}/°C.$ as well as a coefficient of area expansion of approximately the same magnitude. Therefore the heating of the prior art sensor 10 causes the relative dimensions of the respective components to be affected differently, thereby changing the spacing and positions of the respective components, causing variations in measured capacitance. Further, the prior art rods 30 and 31 are affixed in insulators 26 and 27, made from Borosilicate 7052 (known as Kovar). This insulator material has a dielectric constant (k) of 5.1, but also has a measured change in that dielectric constant of 294 parts per million per degree C. (ppm/°C.). This variation alone produces an apparent capacitance change of $2 \times 10^{-4}$ pf/°C., which is sufficient to introduce significant error in measurements made with the prior art sensor. Thus, it is apparent that both construction and material changes were required to the prior art device.

FIGS. 1-4 show a sensor 100 constructed according to the teachings of the invention. Sensor 100 has a top portion 101 made from Invar, having a flat top surface 121 and a slot 103 formed through the flat top surface 121. An Invar sensor head 129 is fixedly positioned within slot 103 to provide an approximately equal air gap around all sides of Invar sensor head 129. Sensor head 129 is fixedly attached by screws 105 and 106 to a Vycor plate 107. Plate 107 is fixedly attached to top portion 101 by means of screws 135 and 136. Top portion 101 is rigidly affixed to bottom portion 123 by means of screws 132 and 133. The result is that all component parts of sensor 100 are rigidly affixed together, and all adjacent materials are formed of the same material. The material known as Vycor is chosen because a change in dielectric constant with temperature of $-22$ parts per million per degree C. (ppm/°C.), and it has a coefficient of linear temperature expansion of less than $1 \times 10^{-6}$ per degree Centigrade, and its coefficient of temperature expansion is nearly identical to Invar. Tests were conducted on this material to determine whether reasonable temperature variations, i.e., $\pm 10°$ C., cause a measurable change in the dielectric constant to yield an apparent capacitance variation as a function of temperature. These tests showed that the apparent capacitance variation attributable to the temperature effects of this dielectric material were less than $1 \times 10^{-5}$ picofarads (pf). This degree of variation is acceptable in order to achieve the accuracy desired from the capacitance sensor.

Screws 105 and 106 project downwardly through apertures 125 and 124 respectively. A conductor 130 is passed through aperture 124 and is secured to screw 106. Alternatively, a conductor may be passed through aperture 125 and secured to screw 105. It is this conductor that transmits the signals which are necessary for a determination of capacitance measurement.

The foregoing construction is selected first to provide materials for the entire assembly which have substantially identical coefficients of temperature expansion, thereby providing a sensor 100 in which the several components will respond nearly identically to changes in temperature in the environment. Second, the construction provides for rigidly affixing all of the components together, thereby providing no condition wherein a particular component may deviate in a critical dimension in a direction which accentuates the corresponding temperature variation of another component. Third, the component materials are selected not only to provide substantially identical coefficients of linear temperature expansion, but also to provide no material which has a coefficient of temperature expansion greater than $1 \times 10^{-6}$ per degree Centigrade. Materials falling within this constraint demonstrate temperature stability which enables the desired sensor capacitance measuring accuracy to be controlled. Fourth, the construction enables an electrical conductor to be affixed to sensor head 129 by means of affixing the conductor to either screw 105 or screw 106, wherein enlarged apertures 124 and 125 are respectively aligned beneath the screws, and no dielectric material is placed in the aperture. The elimination of dielectric materials within apertures 124 and 125 also eliminates any possibility of temperature affects on such materials, and thereby removes an important source of temperature variation found in the apparent capacitance changes in the device of the prior art. The only dielectric material found within recesses 124 and 125 is air, which has no variation with temperature in the context of providing apparent capacitance variations.

In operation, the Invar sensor head 129 is contained within a slot 103, positioned so as to provide an air gap around all sides of the projecting portion of sensor head 129. Sensor head 129 is rigidly affixed to a Vycor plate 107, and Vycor plate 107 is rigidly affixed to top portion 101. Top portion 101 is likewise rigidly affixed to bottom portion 123. Sensor head 129, top portion 101 and bottom portion 123 are all constructed from Invar, and therefore all of these components have identical linear and area coefficients of thermal expansion. Screws 105 and 106 pass through Vycor plate 107 and attach to sensor head 129; this connection provides almost no variation due to temperature effects on the dielectric constant of Vycor, because of its temperature stability. Since the conductor 130 does not pass through an insulator other than air, it is unaffected by temperature changes to a dielectric material. Therefore, the entire sensor device is relatively stable and unaffected by wide variations in temperature, having less than 1/10th the variation of apparent capacitance with change in temperature as compared with the prior art.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A capacitance sensor for measuring thickness variations in film materials passed over and in contact with a relatively smooth housing surface, comprising
    (a) a housing plate having an upper surface comprising said relatively smooth surface, and having an elongate slot therethrough opening into an enlarged recess extending through the bottom of said housing plate, said housing plate being made from a material having a coefficient of linear temperature expansion of less than $1 \times 10^{-6}$ per degree Centigrade;
    (b) a sensor support plate affixed to said housing plate in said enlarged recess, said support plate being constructed of an insulator material having a coefficient of linear temperature expansion of less than $1 \times 10^{-6}$ per degree Centigrade, said material also having a dielectric temperature characteristic so as to produce a capacitance change with temperature no greater than $1 \times 10^{-5}$ picofarads per degree centigrade;
    (c) a sensor affixed to said sensor support plate, said sensor having an upstanding elongate portion sized smaller than said elongate slot, said upstanding portion being positioned centrally in said slot and having an upper surface projecting at least to said housing plate upper surface, said sensor being made from a material having a coefficient of linear temperature expansion of less than $1 \times 10^{-6}$ per degree Centigrade;
    (d) a bottom plate affixed against the lower side of said housing plate, said bottom plate being made from a material having a coefficient of linear temperature expansion of less than $1 \times 10^{-6}$ per degree Centigrade, said bottom plate further having at least one enlarged opening therethrough aligned beneath said sensor support plate and said sensor; and
    (e) electrical conductor means for electrically contacting said sensor, said conductor means passing through said at least one enlarged opening.

2. The apparatus of claim 1, further comprising an electrically conductive fastener affixing said sensor support plate to said sensor, said fastener being aligned with said at least one enlarged opening.

3. The apparatus of claim 2, wherein said electrical conductor means is affixed to said fastener.

4. The apparatus of claim 1, wherein said housing plate, said sensor and said bottom plate are constructed from the same material.

5. The apparatus of claim 4, wherein said same material is Invar.

6. The apparatus of claim 5, wherein said sensor support plate is constructed from Vycor material.

* * * * *